US 12,400,349 B2

United States Patent
Garg et al.

(10) Patent No.: US 12,400,349 B2
(45) Date of Patent: Aug. 26, 2025

(54) JOINT DEPTH PREDICTION FROM DUAL-CAMERAS AND DUAL-PIXELS

(71) Applicant: GOOGLE LLC, Mountain View, CA (US)

(72) Inventors: Rahul Garg, Mountain View, CA (US); Neal Wadhwa, Mountain View, CA (US); Sean Fanello, Mountain View, CA (US); Christian Haene, Mountain View, CA (US); Yinda Zhang, Mountain View, CA (US); Sergio Orts Escolano, Mountain View, CA (US); Yael Pritch Knaan, Mountain View, CA (US); Marc Levoy, Mountain View, CA (US); Shahram Izadi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 271 days.

(21) Appl. No.: 17/640,114

(22) PCT Filed: Apr. 27, 2020

(86) PCT No.: PCT/US2020/030108
§ 371 (c)(1),
(2) Date: Mar. 3, 2022

(87) PCT Pub. No.: WO2021/076185
PCT Pub. Date: Apr. 22, 2021

(65) Prior Publication Data
US 2022/0343525 A1 Oct. 27, 2022

Related U.S. Application Data

(60) Provisional application No. 62/914,988, filed on Oct. 14, 2019.

(51) Int. Cl.
*G06T 7/593* (2017.01)
*G06T 5/70* (2024.01)

(52) U.S. Cl.
CPC .............. *G06T 7/593* (2017.01); *G06T 5/70* (2024.01); *G06T 2207/10028* (2013.01); *G06T 2207/20081* (2013.01); *G06T 2207/20084* (2013.01)

(58) Field of Classification Search
CPC . G06T 7/593; G06T 5/70; G06T 2207/10028; G06T 2207/20081;
(Continued)

(56) References Cited

U.S. PATENT DOCUMENTS

2011/0169921 A1 7/2011 Lee et al.
2015/0302592 A1 10/2015 Bruls et al.
(Continued)

FOREIGN PATENT DOCUMENTS

CN 106934765 A 7/2017
CN 110062934 A 7/2019
(Continued)

OTHER PUBLICATIONS

Agresti, Gianluca, et al. "Deep learning for confidence information in stereo and tof data fusion." Proceedings of the IEEE International Conference on Computer Vision Workshops. 2017. (Year: 2017).*
(Continued)

*Primary Examiner* — Leon Viet Q Nguyen
(74) *Attorney, Agent, or Firm* — MCDONNELL BOEHNEN HULBERT & BERGHOFF LLP

(57) ABSTRACT

Example implementations relate to joint depth prediction from dual cameras and dual pixels. An example method may involve obtaining a first set of depth information representing a scene from a first source and a second set of depth information representing the scene from a second source.
(Continued)

The method may further involve determining, using a neural network, a joint depth map that conveys respective depths for elements in the scene. The neural network may determine the joint depth map based on a combination of the first set of depth information and the second set of depth information. In addition, the method may involve modifying an image representing the scene based on the joint depth map. For example, background portions of the image may be partially blurred based on the joint depth map.

20 Claims, 14 Drawing Sheets

(58) Field of Classification Search
CPC ............. G06T 2207/20084; G06T 5/60; G06T 2207/20012; G06T 5/50; G06N 3/044; G06N 3/045; G06N 3/048; G06N 3/084; H04N 13/122; H04N 2013/0081; H04N 13/239
See application file for complete search history.

(56) References Cited

U.S. PATENT DOCUMENTS

| | | |
|---|---|---|
| 2015/0363970 A1 | 12/2015 | Spinella-Mamo et al. |
| 2016/0350930 A1 | 12/2016 | Lin et al. |
| 2017/0094153 A1* | 3/2017 | Wang .................... H04N 25/704 |
| 2018/0240276 A1* | 8/2018 | He ......................... G06T 15/503 |
| 2019/0289281 A1 | 9/2019 | Badrinarayanan et al. |
| 2021/0209783 A1* | 7/2021 | Yamamoto ........... H04N 13/243 |

FOREIGN PATENT DOCUMENTS

| | | |
|---|---|---|
| KR | 10-2013-0001635 | 1/2013 |
| WO | 2018/102717 A1 | 6/2018 |

OTHER PUBLICATIONS

Denys Agresti, Gianluca, et al. ("Deep learning for confidence information in stereo and tof data fusion." Proceedings of the IEEE International Conference on Computer Vision Workshops. 2017) (Year: 2017).*

Benjamin Busam et al., ("SteReFo: Efficient Image Refocusing with Stereo Vision," arXiv:1909.13395, 2019 IEEE/CVF International Conference on Computer Vision Workshop (ICCVW), Sep. 29, 2019) (Year: 2019).*

Rozumnyi et al., ("Learned Semantic Multi-Sensor Depth Map Fusion," arXiv:1909.00703, 2019 IEEE/CVF International Conference on Computer Vision Workshop (ICCVW), Sep. 2, 2019 ) (Year: 2019).*

Makarov, Ilya, Alisa Korinevskaya, and Vladimir Aliev. ("Sparse depth map interpolation using deep convolutional neural networks." 2018 41st international conference on telecommunications and signal processing (TSP). IEEE, 2018) (Year: 2018).*

The International Search Report (ISR) with Written Opinion for PCT/US2020/030108 dated Sep. 4, 2020, pp. 1-13.

Denys Rozumnyi et al., "Learned Semantic Multi-Sensor Depth Map Fusion," arXiv:1909.00703, 2019 IEEE/CVF International Conference on Computer Vision Workshop (ICCVW), Sep. 2, 2019.

Neal Wadhwa et al., "Synthetic depth-of-field with a single-camera mobile phone," ACM Transactions on Graphics, vol. 37, No. 4, Jul. 30, 2018, pp. 1-13.

Benjamin Busam et al., "SteReFo: Efficient Image Refocusing with Stereo Vision," arXiv:1909.13395, 2019 IEEE/CVF International Conference on Computer Vision Workshop (ICCVW), Sep. 29, 2019.

Muhammad Kashif Ali et al., "Multi-Sensor Depth Fusion Framework for Real-Time 3D Reconstruction," IEEE Access, vol. 7, Sep. 19, 2019, pp. 136471-136480.

* cited by examiner

Figure 4B

JOINT DEPTH PREDICTION FROM DUAL-CAMERAS AND DUAL-PIXELS

CROSS-REFERENCE TO RELATED APPLICATIONS

This application is a U.S. National Phase of International Application No. PCT/US2020/030108, filed Apr. 27, 2020, which claims priority to U.S. Provisional Application No. 62/914,988, filed Oct. 14, 2019, all of which are incorporated by reference herein in their entirety.

BACKGROUND

Many modern computing devices, including mobile phones, personal computers, and tablets, include image capture devices, such as still and/or video cameras. The image capture devices can capture images, such as images that include people, animals, landscapes, and/or objects.

Some image capture devices and/or computing devices can correct or otherwise modify captured images. For example, some image capture devices can provide "red-eye" correction that removes artifacts such as red-appearing eyes of people and animals that may be present in images captured using bright lights, such as flash lighting. After a captured image has been corrected, the corrected image can be saved, displayed, transmitted, printed to paper, and/or otherwise utilized. In some cases, an image of an object may suffer from poor lighting during image capture.

SUMMARY

Disclosed herein are embodiments that relate a depth estimation technique that can be used to estimate the depth of elements in a scene. Particularly, a computing system may train a neural network to combine estimation data (e.g., original images and/or preliminary depth maps) obtained from multiple sources (e.g., cameras and/or other computing systems) to produce a joint depth map of the scene. By utilizing multiple estimation techniques, the neural network may combine depth estimation techniques in a way that relies on the more accurate aspects of each technique while relying less (if at all) on the less accurate aspects of the techniques. The depth map output by the neural network could subsequently be used to modify features of one or more of the original images (or an aggregation of the images). For example, a background portion of an image may be partially blurred to make one or more objects in the foreground stand out.

Accordingly, in a first example embodiment, a method involves obtaining, at a computing system, a first set of depth information representing a scene from a first source and a second set of depth information representing the scene from a second source. The method also involves determining, at the computing system and using a neural network, a joint depth map that conveys respective depths for elements in the scene, where the neural network determines the joint depth map based on a combination of the first set of depth information and the second set of depth information. The method further involves modifying an image representing the scene based on the joint depth map.

In a second example embodiment, an article of manufacture may include a non-transitory computer-readable medium, having stored thereon program instructions that, upon execution by a camera device, cause the camera device to perform operations in accordance with the first example embodiment.

In a third example embodiment, a system may include a plurality of sources, a computing system, as well as data storage and program instructions. The program instructions may be stored in the data storage, and upon execution by at least one processor may cause the computing system to perform operations in accordance with the first example embodiment.

In a fourth example embodiment, a system may include various means for carrying out each of the operations of the first example embodiment.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4B depicts a convolution, in accordance with example embodiments

DETAILED DESCRIPTION

Figure 1:
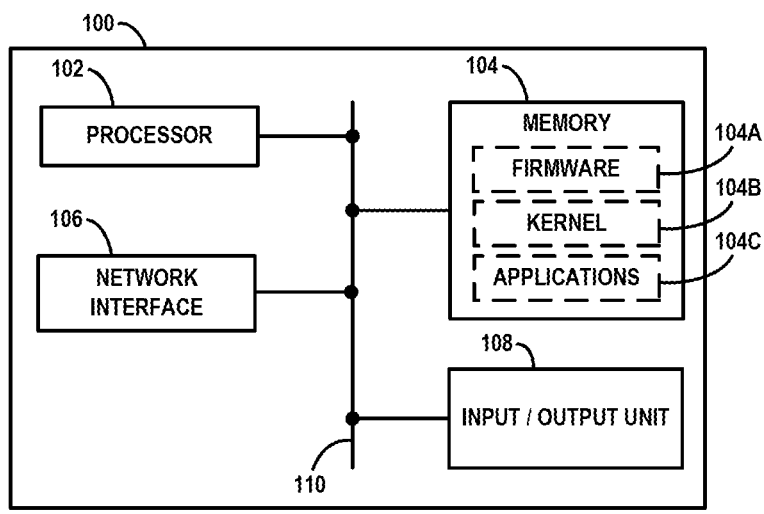
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Depth estimation is a technique that has several applications, including in image processing. Depth estimation data is often configured as a depth map, which can be a map or other data structure that stores information relating to the distances of surfaces of scene objects from a viewpoint (e.g., the perspective of one or more cameras). For example, the depth map for an image captured by a camera can specify information relating to the distance from the camera to surfaces of objects depicted in the image, where the depth map can specify the information for the image on a pixel-by-pixel (or other) basis. For example, the depth map can include a depth value for each pixel in the image, where the depth value DV1 of depth map DM for pixel PIX of image IM represents a distance from the viewpoint to one or more objects depicted by pixel PIX in image IM. As another example, an image can be divided into regions (e.g., blocks of N×M pixels where N and M are positive integers) and the depth map can include a depth value for each region of pixels in the image (e.g., a depth value DV2 of depth map DM for pixel region PIXR of image IM represents a distance from the viewpoint to one or more objects depicted by pixel region PIXR in image IM). Other depth maps and correspondences between pixels of images and depth values of depth maps are possible as well.

There are different ways to develop depth maps with each one having some obstacles that can reduce accuracy of the estimation. In one aspect, estimating a depth map for a scene can involve performing stereo vision using images captured from multiple cameras. Similar to three-dimensional (3D) sensing in human vision, stereo vision may involve identifying and comparing image pixels that represent the same point in the scene within one or more pair of images depicting the scene. In particular, because the cameras capture the scene from slightly different perspectives, the 3D position of a point within the can be determined via triangulation using a ray extending from each camera to the point. As a processor identifies more pixel pairs across the images, the processor may assign depth to more points within the scene until a depth map can be generated for the scene. In some instances, correlation stereo methods are used to obtain correspondences for pixels in the stereo images, which can result in thousands of 3D values generated with each stereo image.

When comparing pairs of images representing a scene as captured by dual cameras, the processor may detect one or more slight differences between the images. For example, an object positioned the foreground of the scene relative to the cameras may appear to remain relatively static while the background appears to shift (e.g., a vertical move) when comparing the images. This shift of the background across the different images can be referred to as parallax, which can be used to determine depths of surfaces within the scene. As indicated above, the processor may estimate a magnitude of the parallax and thus depth of one or more points of the scene by identifying corresponding pixels between the views and further factoring the cameras' baseline (i.e., the distance between the cameras).

Another approach used to estimate a depth map for a scene involves using a single camera. In particular, rather than using multiple cameras to obtain different perspectives of a scene, the camera may enable the use of dual pixels to generate slightly different perspectives of the scene. The dual pixel technique mirrors dual camera, but involves dividing pixels into different parts (e.g., two parts). The different parts of each pixel may then represent the scene from a different perspective enabling depth to be estimated. For example, a dual pixel image may contain pixels that are split into two parts, such as a left pixel and a right pixel. In some examples, the different parts of the pixels may be referred to as subpixels.

By splitting the pixels into different parts, the image can be divided and analyzed as two images, such as a left pixel image and a right pixel image. The left pixel image and right pixel image can then be processed in a manner similar to the depth estimation process described above with respect to dual cameras. In particular, pairs of corresponding pixels from the left and right pixel images can be paired and used along with the baseline between the different pixel parts (e.g., a few millimeters or less) to estimate depth of surfaces within the scene. Thus, although the baseline between the different portions of the dual pixels might be much smaller than the baseline between dual cameras, a processor may perform a similar depth estimation process as described above using the dual pixels within the image to derive a depth map of the scene.

As shown above, a device may be configured to estimate depth of a scene in different ways. In some situations, the technique used to estimate a depth map for a scene can impact the accuracy of the depth map. In particular, the proximity of an object relative to the camera or cameras can influence the accuracy of depth estimation. The larger baseline between dual cameras can decrease the accuracy of a depth map for a scene when an object is positioned near the cameras (e.g., 1 meter or less). Conversely, the smaller baseline associated with dual pixels can decrease the accuracy for depth estimations of surfaces positioned far from the camera (e.g., 10 meters or more). Thus, although both techniques may be used for to determine a depth map for an image, there is some situations where one of the techniques may produce better results. Accordingly, it might be desirable for a computing system to be able to use the above techniques in a way that can reduce complexity and increase the accuracy of a depth map generated for a scene.

Examples presented herein describe methods and systems for joint depth prediction from dual cameras and dual pixels. To overcome potential obstacles that are associated with the different depth estimation techniques described above, example embodiments may involve using a combination of multiple depth estimation techniques to generate a depth map for a scene. For example, a computing system may use the dual camera technique and the dual pixel technique to generate a depth map for a scene. When generating the depth map, the larger parallax associated with dual cameras may enable more accurate depth estimations for objects positioned farther from the cameras while the smaller parallax associated with dual pixels may enable more accurate depth estimation for objects positioned nearby.

In some examples, a depth estimation derived using stereo images can be improved using the dual pixel technique. In particular, the accuracy of the depth estimation may be improved based on an observation that the parallax is one of many depth cues present in images, including semantic, defocus, and other potential cues. An example semantic cue may be an inference that a relatively-close object takes up more pixels in an image than a relatively-far object. A defocus cue may be a cue based on the observation that points that are relatively far from an observer (e.g., a camera) appear less sharp blurrier than relatively-close points. In some examples, a neural network can be trained to use parallax cues, semantic cues, and other aspects of dual pixel images to predict depth maps for input dual pixel images.

In some embodiments, a neural network may be trained to perform a weighted analysis of depth data (e.g., images from cameras and/or depth estimations) to generate a joint depth prediction. This way, a joint depth map may combine the more accurate aspects of each depth estimation technique while relying less (or not at all) on the less accurate aspects of the techniques. Through training, the neural network may learn how to weight depth information inputs in a manner that produces optimal joint depth estimation that can be subsequently used to modify images or perform other image processing techniques.

To illustrate an example, when a neural network is estimating a joint depth map for a scene positioned far away from the viewpoint of a device configured with the cameras capturing images, the neural network may apply a greater weight to depth information derived from images captured using a multiple camera stereo arrangement relative to the weight applied to depth informative derived from images using a single camera. This way, the strength of multi-camera stereo vision may have a greater impact on the final joint depth map than the impact derived from single-camera techniques. As another example, when a neural network is estimating a joint depth map for a scene positioned near the viewpoint of the device configured with the cameras, the neural network may apply a greater weigh to depth information derived from images captured using a single-camera technique (e.g., dual pixel, green subpixels) relative to the weight applied to the multi-camera stereo technique. The single-camera techniques may provide more accurate results that could positively impact a joint depth map generated for a near-field scene.

The joint depth map could be used for various applications. In some examples, the joint depth prediction can be used to modify one or more images. For example, to partially blur an image, a background portion of an image with a depth farther away from the viewpoint of the camera(s) as determined by depth data can be at least partially blurred. Appropriate blurring software can employ a depth map to apply a natural and pleasing depth-dependent blur to a background of an image while keeping a foreground object in sharp focus. Also, depth maps of images may have other application in computational photography, augmented reality, and image processing.

In some embodiments, a system may use a dual-camera technique and a dual-pixel technique to further obtain complementary information regarding differently oriented lines and texture within a scene. Particularly, when the baselines of each technique are orthogonal, the system may use a combination of the techniques to identify different orientations of lines and the texture within a scene. For instance, the dual cameras may have a baseline orientation (e.g., a vertical or horizontal baseline) that can make it hard to estimate the depth of lines having the same orientation within images. If the dual pixels' baseline is orthogonal baseline relative to the dual camera's baseline orientation, the dual pixel image can then be used to help estimate the depth for lines and texture that are difficult to detect using the dual cameras. As such, the information can be used to perform one or more image processing techniques as discussed above, such as a partial blur that enhances the focus of the image on one or more objects in the foreground. In addition, the multiple techniques can be used to improve images, such as portrait-mode images, captured at near and far distances from a device.

I. Example Computing Devices and Cloud-Based Computing Environments

The following embodiments describe architectural and operational aspects of example computing devices and systems that may employ the disclosed ANN implementations, as well as the features and advantages thereof.

FIG. 1 is a simplified block diagram exemplifying a computing system 100, illustrating some of the components that could be included in a computing device arranged to operate in accordance with the embodiments herein. Computing system 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing system 100 includes processor 102, memory 104, network interface 106, and an input/output unit 108, all of which may be coupled by a system bus 110 or a similar mechanism. In some embodiments, computing system 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re writable digital video discs (DVDs), and/or tape storage, as just a few examples.

Computing system 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing system 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing system 100. Applications 104C may be one or more user-space software programs, such as web browsers or email clients, as well as any software libraries used by these programs. In some examples, applications 104C may include one or more neural network applications. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing system 100 may include Ethernet, BLUETOOTH®, and Wifi interfaces.

Input/output unit 108 may facilitate user and peripheral device interaction with computing system 100 and/or other computing systems. Input/output unit 108 may include one or more types of input devices, such as a keyboard, a mouse, one or more touch screens, sensors, biometric sensors, and so on. Similarly, input/output unit 108 may include one or more types of output devices, such as a screen, monitor, printer, and/or one or more light emitting diodes (LEDs). Additionally or alternatively, computing system 100 may communicate with other devices using a universal serial bus (USB) or high-definition multimedia interface (HDMI) port interface, for example.

In some embodiments, one or more instances of computing system 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing system 100 may enable performance of embodiments described herein, including using neural networks and implementing a neural light transport.

Figure 2:
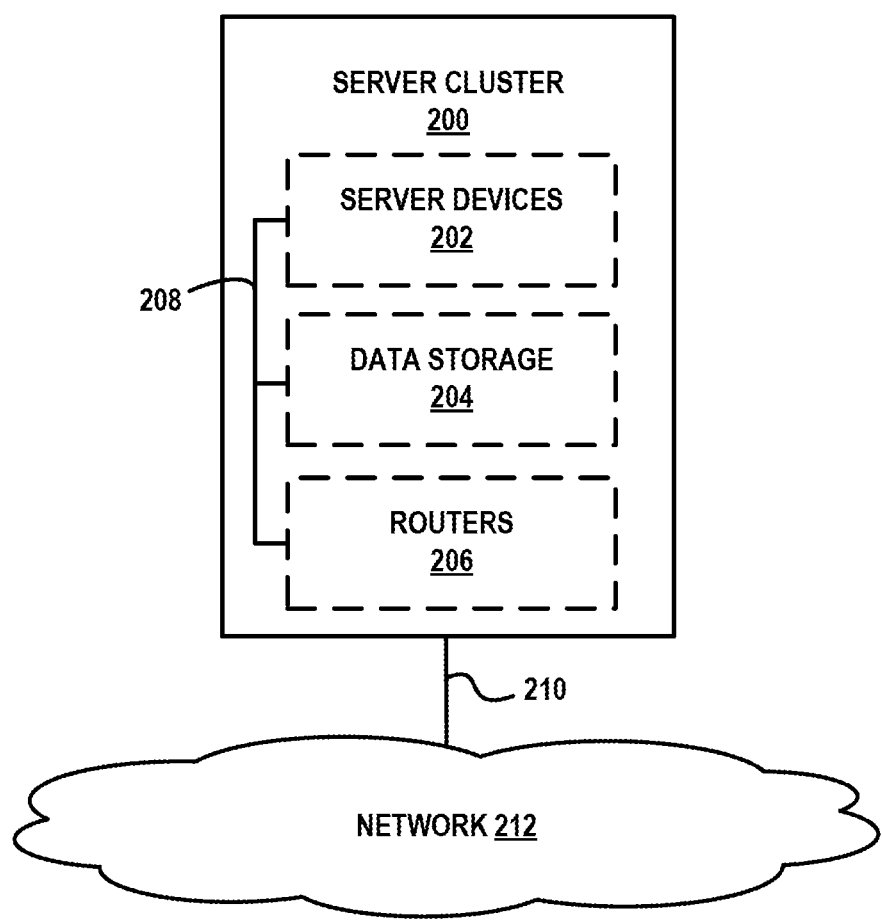
FIG. 2 illustrates a schematic drawing of a server device cluster, in accordance with example embodiments.

FIG. 2 depicts a cloud-based server cluster 200 in accordance with example embodiments. In FIG. 2, one or more operations of a computing device (e.g., computing system 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200. In some examples, server cluster 200 may perform one or more operations described herein, including the use of neural networks and implementation of a neural light transport function.

Server devices 202 can be configured to perform various computing tasks of computing system 100. For example, one or more computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Ped, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Artificial Neural Network

A. Example ANN

An artificial neural network (ANN) is a computational model in which a number of simple units, working individually in parallel and without central control, can combine to solve complex problems. An ANN is represented as a number of nodes that are arranged into a number of layers, with connections between the nodes of adjacent layers.

Figure 3A:
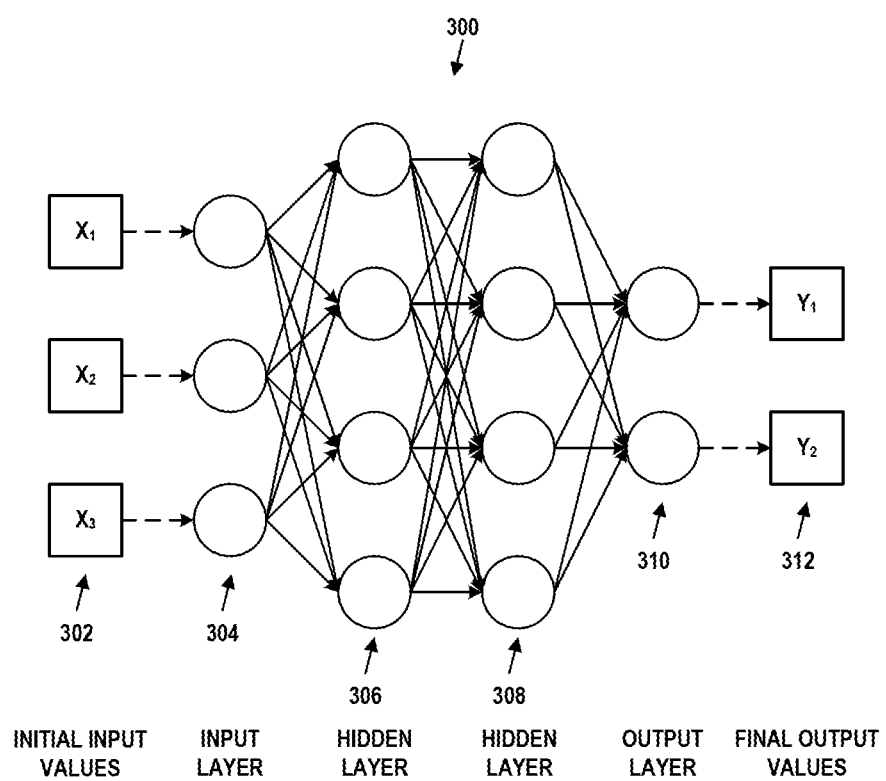
FIG. 3A depicts an ANN architecture, in accordance with example embodiments.

An example ANN 300 is shown in FIG. 3A. Particularly, ANN 300 represents a feed-forward multilayer neural network, but similar structures and principles are used in convolution neural networks (CNNs), recurrent neural networks, and recursive neural networks, for example. ANN 300 can represent an ANN trained to perform particular tasks, such as image processing techniques (e.g., segmentation, semantic segmentation, image enhancements) or learning neural light transport functions described herein. In further examples, ANN 300 can learn to perform other tasks, such as computer vision, risk evaluation, etc.

As shown in FIG. 3A, ANN 300 consists of four layers: input layer 304, hidden layer 306, hidden layer 308, and output layer 310. The three nodes of input layer 304 respectively receive $X_1$, $X_2$, and $X_3$ as initial input values 302. The two nodes of output layer 310 respectively produce $Y_1$ and $Y_2$ as final output values 312. As such, ANN 300 is a fully-connected network, in that nodes of each layer aside from input layer 304 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \Sigma_{i=1}^{n} x_i w_i + b \quad (1)$$

Where b is a node-specific or layer-specific bias.

Notably, the fully-connected nature of ANN 300 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \quad (2)$$

Functions other than the logistic function, such as the sigmoid or tanh functions, may be used instead.

Then, y may be used on each of the node's output connections, and will be modified by the respective weights thereof. Particularly, in ANN 300, input values and weights are applied to the nodes of each layer, from left to right until final output values 312 are produced. If ANN 300 has been fully trained, final output values 312 are a proposed solution to the problem that ANN 300 has been trained to solve. In order to obtain a meaningful, useful, and reasonably accurate solution, ANN 300 requires at least some extent of training.

B. Training

Training an ANN may involve providing the ANN with some form of supervisory training data, namely sets of input values and desired, or ground truth, output values. For example, supervisory training to enable an ANN to perform image processing tasks can involve providing pairs of images that include a training image and a corresponding ground truth mask that represents a desired output (e.g., desired segmentation) of the training image. For ANN 300, this training data may include m sets of input values paired with output values. More formally, the training data may be represented as:

$$\{X_{1,i}, X_{2,i}, X_{3,i}, \hat{Y}_{1,i}, \hat{Y}_{2,i}\} \quad (3)$$

Where $i=1 \ldots m$, and $\hat{Y}_{1,i}$ and $\hat{Y}_{2,i}$ are the desired output values for the input values of $X_{1,i}$, $X_{2,i}$, and $X_{3,i}$.

The training process involves applying the input values from such a set to ANN 300 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 300 in a fashion that results in a lower error for future iterations of the training data. For example, the update process can involve modifying at least one weight of ANN 300 such that subsequent applications of ANN 300 on training images generates new outputs that more closely match the ground truth masks that correspond to the training images.

The training process continues applying the training data to ANN 300 until the weights converge. Convergence occurs when the error is less than a threshold value or the change in the error is sufficiently small between consecutive iterations of training. At this point, ANN 300 is said to be "trained" and can be applied to new sets of input values in order to predict output values that are unknown. When trained to perform image processing techniques, ANN 300 may produce outputs of input images that closely resemble ground truths (i.e., desired results) created for the input images.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 300. Thus, the weights of the connections between hidden layer 308 and output layer 310 are updated first, the weights of the connections between hidden layer 306 and hidden layer 308 are updated second, and so on. This updating is based on the derivative of the activation function.

Figure 3B:
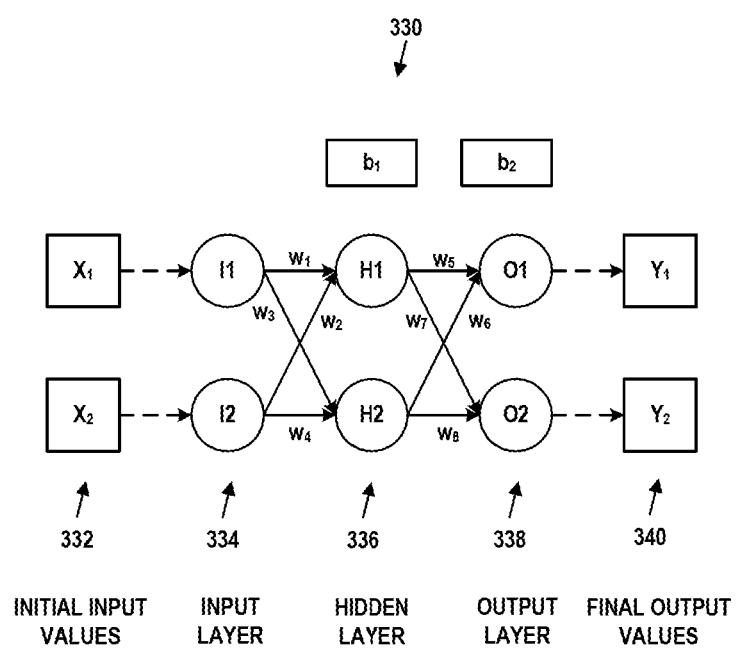
FIG. 3B depicts training an ANN, in accordance with example embodiments.

In order to further explain error determination and backpropagation, it is helpful to look at an example of the process in action. However, backpropagation can become quite complex to represent except on the simplest of ANNs. Therefore, FIG. 3B introduces a very simple ANN 330 in order to provide an illustrative example of backpropagation.

TABLE 1

| Weight | Nodes |
|---|---|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

ANN 330 consists of three layers, input layer 334, hidden layer 336, and output layer 338, each having two nodes. Initial input values 332 are provided to input layer 334, and output layer 338 produces final output values 340. Weights have been assigned to each of the connections and biases (e.g., $b_1$, $b_2$ shown in FIG. 3B) may also apply to the net input of each node in hidden layer 336 in some examples. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

The goal of training ANN 330 is to update the weights over some number of feed forward and backpropagation iterations until the final output values 340 are sufficiently close to designated desired outputs. Note that use of a single set of training data effectively trains ANN 330 for just that set. If multiple sets of training data are used, ANN 330 will be trained in accordance with those sets as well.

1. Example Feed Forward Pass

To initiate the feed forward pass, net inputs to each of the nodes in hidden layer 336 are calculated. From the net inputs, the outputs of these nodes can be found by applying the activation function. For node H1, the net input $net_{H1}$ is:

$$net_{H1} = w_1 X_1 + w_2 X_2 + b_1 \tag{4}$$

Applying the activation function (here, the logistic function) to this input determines that the output of node H1, $out_{H1}$ is:

$$out_{H1} = \frac{1}{1 + e^{-net_{H1}}} \tag{5}$$

Following the same procedure for node H2, the output $out_{H2}$ can also be determined. The next step in the feed forward iteration is to perform the same calculations for the nodes of output layer 338. For example, net input to node O1, $net_{O1}$ is:

$$net_{O1} = w_5 out_{H1} + w_6 out_{H2} + b_2 \tag{6}$$

Thus, output for node O1, $out_{O1}$ is:

$$out_{O1} = \frac{1}{1 + e^{-net_{O1}}} \tag{7}$$

Following the same procedure for node O2, the output $out_{O2}$ can be determined. At this point, the total error, $\Delta$, can be determined based on a loss function. For instance, the loss function can be the sum of the squared error for the nodes in output layer 508. In other words:

$$\Delta = \Delta_{O1} + \Delta_{O2} = \tfrac{1}{2}(out_{O1} - \hat{Y}_1)^2 + \tfrac{1}{2}(out_{O2} - \hat{Y}_2)^2 \tag{8}$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins.

2. Backpropagation

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \tag{9}$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

This process can be repeated for the other weights feeding into output layer 338. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 336. This process can be repeated for the other weights feeding into output layer 338. At this point, the backpropagation iteration is over, and all weights have been updated. ANN 330 may continue to be trained through subsequent feed forward and backpropagation iterations. In some instances, after over several feed forward and backpropagation iterations (e.g., thousands of iterations), the error can be reduced to produce results proximate the original desired results. At that point, the values of $Y_1$ and $Y_2$ will be close to the target values. As shown, by using a differentiable loss function, the total error of predictions output by ANN 330 compared to desired results can be determined and used to modify weights of ANN 330 accordingly.

In some cases, an equivalent amount of training can be accomplished with fewer iterations if the hyper parameters of the system (e.g., the biases $b_1$ and $b_2$ and the learning rate a) are adjusted. For instance, the setting the learning rate closer to a particular value may result in the error rate being reduced more rapidly. Additionally, the biases can be updated as part of the learning process in a similar fashion to how the weights are updated.

Regardless, ANN 330 is just a simplified example. Arbitrarily complex ANNs can be developed with the number of nodes in each of the input and output layers tuned to address specific problems or goals. Further, more than one hidden layer can be used and any number of nodes can be in each hidden layer.

III. Convolutional Neural Networks

A convolutional neural network (CNN) is similar to an ANN, in that the CNN can consist of some number of layers of nodes, with weighted connections there between and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 4A:
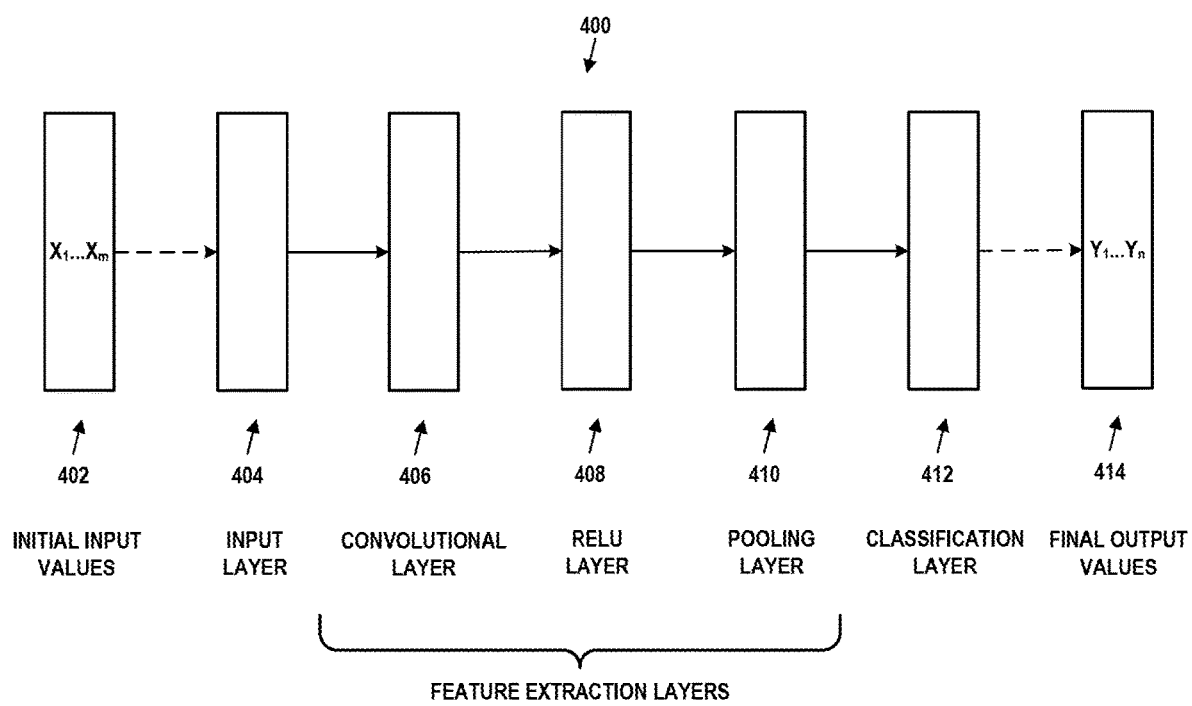
FIG. 4A depicts a convolution neural network (CNN) architecture, in accordance with example embodiments.

An example CNN 400 is shown in FIG. 4A. Initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, RELU layer 408, and pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections there between, and generally has a width and height less than that of the input values. The result for each filter may be a two-dimensional block of output values (referred to as an feature map) in which the width and height can have the same size as those of the input values, or one or more of these dimensions may have different size. The combination of each filter's output results in layers of feature maps in the depth dimension, in which each layer represents the output of one of the filters.

Figure 4B:
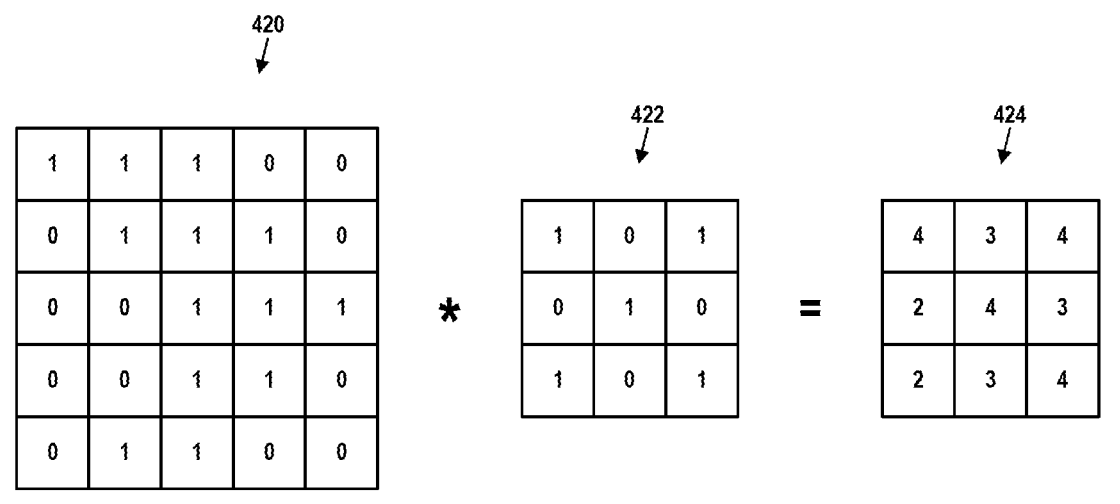

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyper-parameter called receptive field determines the number of connections between each node in convolutional layer 406 and input layer 404. This allows each node to focus on a subset of the input values.

RELU layer 408 applies an activation function to output provided by convolutional layer 406. In practice, it has been determined that the rectified linear unit (RELU) function, or a variation thereof, appears to provide strong results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by down-sampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

Not unlike an ANN, a CNN can include a different number of layers than is shown in the examples herein, and each of these layers may include a different number of nodes. Thus, CNN 400 is merely for illustrative purposes and should not be considered to limit the structure of a CNN.

Figure 5:
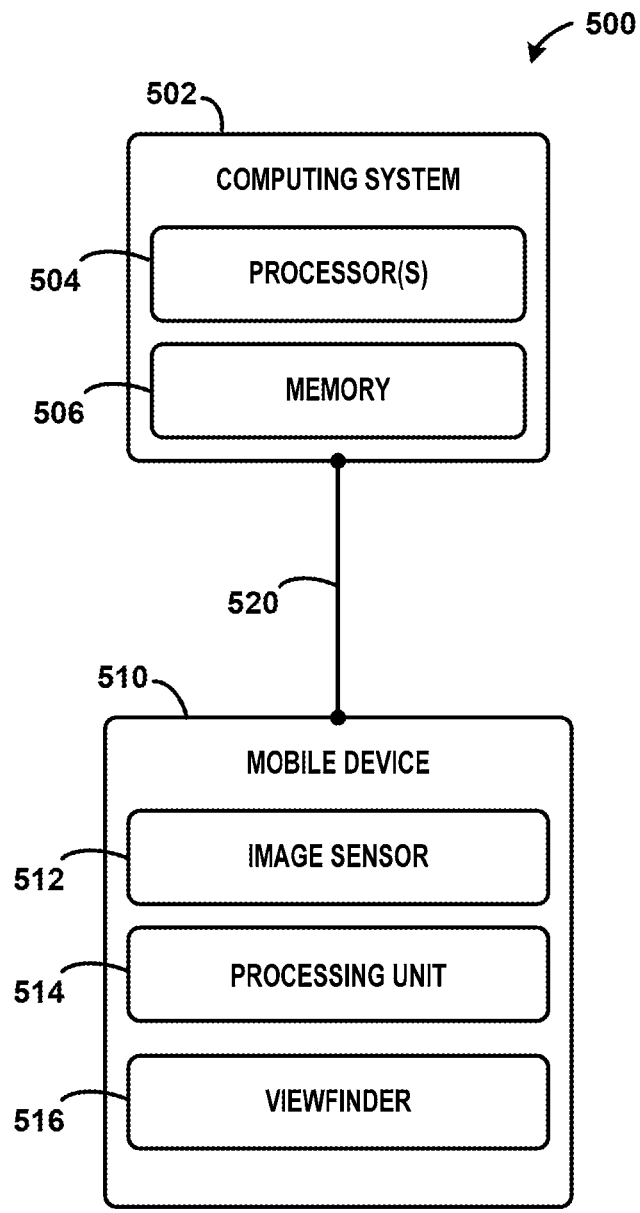
FIG. 5 depicts a system involving an ANN and a mobile device, in accordance with example embodiments.

FIG. 5 depicts system 500 involving an ANN operating on computing system 502 and mobile device 510 in accordance with example embodiments.

The ANN operating on computing system 502 may correspond to ANN 300 or ANN 330 described above. For example, the ANN could be configured to execute instructions so as to carry out operations described, including determining a joint depth map. In some examples, the ANN may represent a CNN (e.g., CNN 400), a feedforward ANN, a gradient descent based activation function ANN, or a regulatory feedback ANN, among other types.

As an example, the ANN could determine a plurality of image processing parameters or techniques based on a set of training images. For example, the ANN could be subject to a machine-learning process to "learn" how to manipulate images like human professionals. The set of training images could include numerous image pairs. For instance, the ANN could analyze 1,000-10,000 image pairs. Each of the image pairs could include an "original" image (also referred to herein as an input image) and a corresponding ground truth mask that represents the desired qualities for the original image to have. In some instances, the ground truth mask represents the desired segmentation of the training image. In further examples, the ground truth mask can represent other desired qualities for the corresponding input image to have after an application of the ANN.

Masks are often used in image processing and can involve setting the pixel values within an image to zero or something other background value. For instance, a mask image can correspond to an image where some of the pixel intensity values are zero, and other pixel values are non-zero (e.g., a binary mask that uses "1's" and "0's"). Wherever the pixel intensity value is zero in the mask image, then the pixel intensity of the resulting masked image can be set to the background value (e.g., zero). To further illustrate, an example mask may involve setting all pixels that correspond to an object in the foreground of an image to white and all pixels that correspond to background features or objects to black. Prediction masks can correspond to estimated segmentations of an image (or other estimated outputs) produced by an ANN. The prediction masks can be compared to a ground truth mask, which can represent the desired segmentation of the input image.

In an example embodiment, the ground truth mask could be developed and adjusted by humans using image processing/manipulation programs such as Adobe Lightroom, Adobe Photoshop, Adobe Photoshop Elements, Google Picasa, Microsoft Photos, DxO OpticsPro, Corel PaintShop Pro, or Apple Photos. In other examples, the ground truth mask could be developed by one or more previously trained ANNs. For instance, the ground truth mask could be determined using multiple iterations of an ANN. In another example, the ground truth mask could be generated based on a combination of an ANN and additional adjustments by a human. It will be understood that other types of image processing software are possible and contemplated herein. Alternatively, the image pairs could represent adjustment of original images using preset or random filters or other image adjustment algorithms.

During the machine-learning process, the ANN could determine a set of "weights" representative of different types of image manipulations made by humans (or more computationally-complex processing). More specifically, these weights could be associated with various image parameters, such as exposure, clarity, contrast, sharpness, hue, saturation, color, chromatic aberration, focus, tint, white balance, color mapping, HDR tone mapping, etc. The weights can also impact segmentation, semantic segmentation, or other image processing techniques applied by the ANN. It will be understood that weights associated with other image parameters are possible. Over time, and with a sufficient number of training images, the ANN could develop these weights as a set of image processing parameters that could be used for representations of the ANN. In other examples, the weights of ANN can depend on other tasks that the ANN is being trained to perform.

Figure 6:
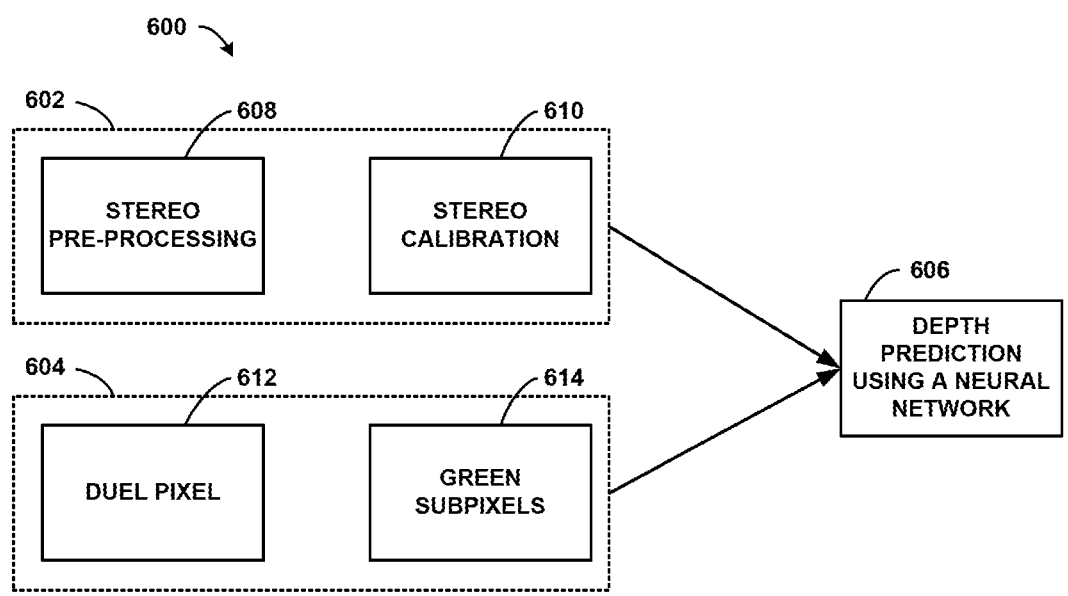
FIG. 6 depicts a system for generating a depth estimation of a scene, in accordance with example embodiments.

FIG. 6 illustrates a system for enhanced depth estimation in accordance with example embodiments. System 600 represents an example system that may train and use a neural network to analyze and produce an enhanced depth estimation using multiple depth estimation techniques. As shown in FIG. 6, system 600 may involve using multi-camera depth information 602 (e.g., stereo vision from two or more cameras) and single-camera depth information 604 (e.g., dual pixel 612, green subpixels 614). The combination of the depth information 602, 604 may be used by a neural network (e.g., ANN, CNN) to develop and provide a joint depth prediction of a scene that can be subsequently used to enhance images of the scene in various ways, such as simulating a Bokeh effect for an image or partially-blurring portions of an image in other ways.

One or more computing systems (e.g., computing system 100 shown in FIG. 1) may perform features of system 600. For instance, a smartphone with multiple cameras may capture multi-camera depth information 602 and single-camera depth information 604. The cameras capturing the images may be configured to provide one or both of multi-camera depth information 602 and single-camera depth information 604. For example, the smartphone may include a pair of cameras that can operate in stereo with one or both cameras also configured to capture images for single-camera depth information 604. As such, the smartphone and/or another computing system (e.g., a remote server) may execute a trained neural network that can use the images and depth estimates to produce a joint depth map for the scene. The joint depth map can be used by one or more computing systems to subsequently modify an output of the image. To illustrate an example, the depth map can be used to partially blur background portions of the image to enhance focus of object(s) positioned in the foreground.

The neural network implemented within the system 600 may be trained by one or more computing systems. In addition, the trained neural network may execute on various computing devices, such as wearable computing devices, smartphones, laptop computers, and servers. In some examples, a first computing system may train the neural network and provide the trained neural network to a second computing system.

Multi-camera depth information 602 may represent images and other data obtained from multiple cameras, such as two or more cameras in a stereo arrangement. In some examples, multi-camera depth information 602 may include images that are processed by the trained neural network to develop the joint depth map estimation. In other examples, multi-camera depth information 602 may include depth data in the form of a depth map or other data derived using a multi-camera depth estimation technique (e.g., stereo vision). In these examples, the trained neural network may obtain the depth data (and potentially the images captured from the cameras) to determine the joint depth map.

In some embodiments, stereo vision may involve stereo pre-processing 608 and stereo calibration 610. Stereo pre-processing may 608 involve preparing sets of images for subsequent depth analysis. This may include cleaning up and organizing images for stereo calibration 610. In some examples, stereo preprocessing may involve using a ring buffer for a camera (e.g., a telephoto camera) and raw telephoto images may be binned at a sensor 2×2 to save memory and power. In addition, frames of images may be aligned and merged to reduce noise. This may be similar to high-dynamic range imaging (HDRI), which can be used to reproduce a greater dynamic range of luminosity. In some examples, stereo pre-processing 608 may also involve a selection of the base frame to match that of a primary camera (if designated). In addition, low-resolution finish may be used to save time.

Stereo calibration 610 may involve using one or a combination of feature matching and structure from motion and/or direct self-rectification (DSR). In some examples, depth estimation using images from multiple cameras may involve other techniques. Feature matching may involve detecting features across multiple images to match image regions using local features. Local features can be robust to occlusion and clutter and can help differentiate a large database of objects. This can enable disparity to be determined among the images and assist with image alignment and 3D reconstruction (e.g., stereo). Different types of feature detectors may be used, such as scale-invariant feature transform (SIFT) or speeded-up robust features (SURF).

Structure from motion may involve estimating 3D structures from 2D image sequences that may be coupled with local motion signals. To find correspondence between images, features such as corner points (edges with gradients in multiple directions) can be tracked between images. The feature trajectories over time can then be used to reconstruct their 3D positions and the camera's motion. In some instances, geometric information (3D structure and camera motion) may be directly estimated from the images, without intermediate abstraction to features or corners.

DSR may be used to perform stereo rectification and may remove the need of individual offline calibration for every pair of cameras. DSR may involve minimizing the vertical displacements of corresponding points between the original image and the transformed image. DSR may be specific to dual cameras on a phone (e.g., cameras arranged for stereo). In some instances if Y and Z components of baseline are small, images may be rectified by warping only one of the images. This enables directly solving for the warp by aligning feature matches in the image space.

Single-camera depth information 604 may represent images and other data obtained from one or more cameras capable of individually being used for depth information. For example, a smartphone or another computing system may include a camera configured to capture images for depth estimation techniques, such as dual pixel 612 and green subpixels 614. Other single-camera techniques may be used to derive depth information that the trained neural network may use to generate the joint depth estimation of a scene.

In some examples, single-camera depth information 604 may include images that are processed by the trained neural network to develop the joint depth map estimation. In other examples, single-camera depth information 602 may include depth data in the form of a depth map or other data derived using one or more single-camera depth estimation techniques (e.g., dual pixel 612 and green subpixels 614). In these examples, the trained neural network may obtain the depth data (and potentially the images captured from the one or more cameras) to determine the joint depth map.

Dual pixel 612 and green subpixels 614 are similar techniques that can enable depth maps to be generated based on images captured using a single camera. For instance, depth may be computed from dual pixel images by using each dual pixel image as two different single pixel images and trying to match the two different single pixel images. The depth of each point determines how much the pixels move between the two views. Green subpixels 614 may represent a similar technique that may involve using the green subpixels within pixels of an image as a way to create multiple images from the image that are analyzed using triangulation to determine depth.

Depth prediction using a neural network 606 may involve generating an enhanced depth map or depth data in another structure using a trained neural network. The trained neural network could use multi-camera depth information 602 and single-camera depth information 604 as inputs to generate a joint depth map as an output. The joint depth map may be used to subsequently modify one or more images of the scene, such as partially blurring one or more portions of an image.

Figure 7A:
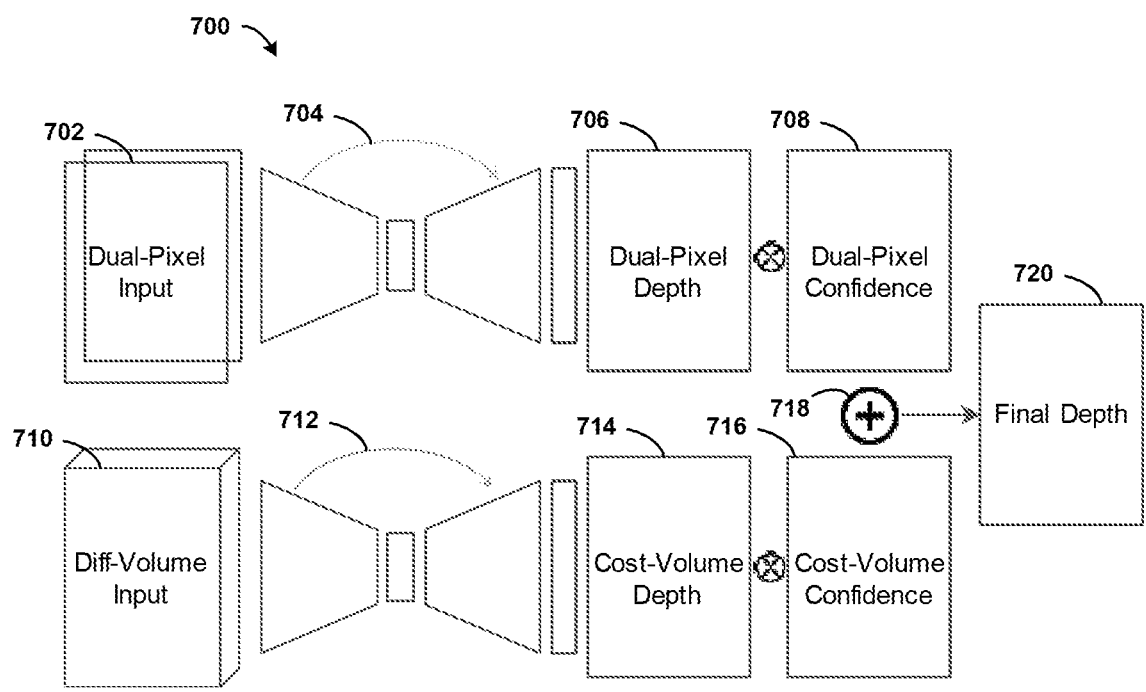
FIG. 7A illustrates a first arrangement for joint depth estimation architecture, according to example embodiments.

FIG. 7A illustrates a first arrangement for joint depth estimation architecture, according to example embodiments. Joint depth estimation architecture 700 represents an example architecture that may be used to generate a joint depth map based on multiple inputs, such as dual-pixel input 702 and diff-volume input 710. Other example arrangements are possible.

Dual-pixel input 702 and diff-volume input 710 represent single-camera and multi-camera depth information that may be used an inputs to derive depth estimations and associated confidences for the estimations. For instance, neural network 704 or another processing technique may use dual-pixel input 702 to generate dual-pixel depth 706, which represents a depth map of the scene according to dual-pixel input 702.

In addition, dual-pixel depth 706 may include dual-pixel confidence 708 that indicates a confidence level associated with the depth map. The confidence level may vary for different portions of dual-pixel depth 706. Similarly, neural network 712 or another processing technique may use diff-volume input 710 to generate cost-volume depth 714, which may represent a depth map of the scene according to diff-volume input 710. Cost-volume depth 714 may also include cost-volume confidence 716 that represents a confidence level or levels associated with portions of the depth map. A neural network may use and combine 718 information, such as dual-pixel depth 706, dual-pixel confidence 708, cost-volume depth 714, and cost-volume confidence 716 to generate final depth map 720.

Figure 7B:
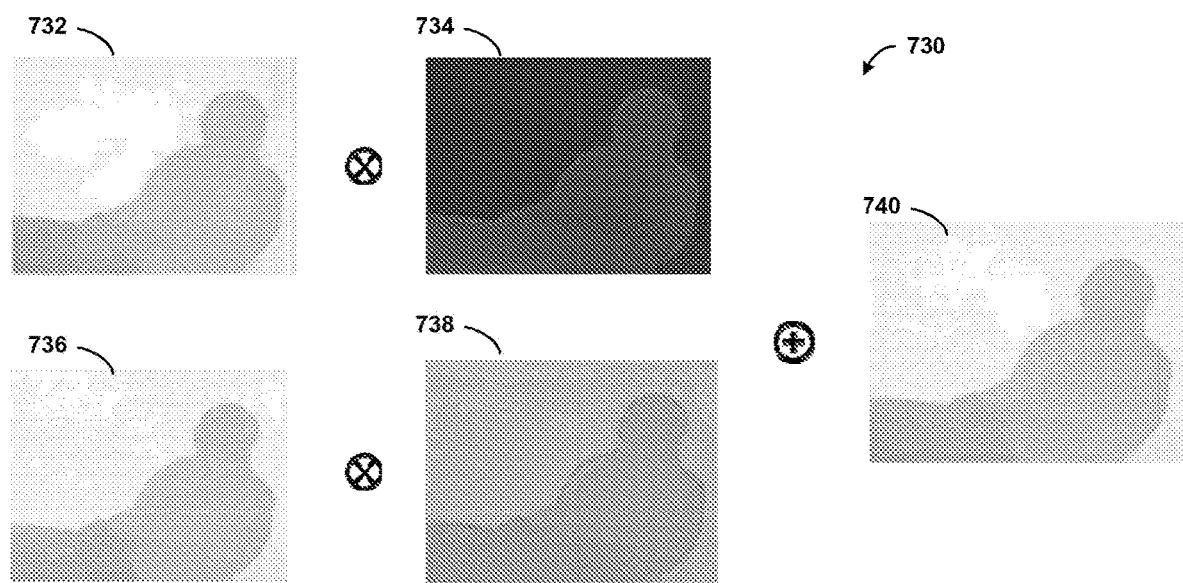
FIG. 7B illustrates an implementation of the joint depth estimation architecture shown in FIG. 7A, according to example embodiments.

FIG. 7B illustrates an implementation of the joint depth estimation architecture shown in FIG. 7A, according to example embodiments. Implementation 730 represents an example implementation of joint depth estimation architecture 700 shown in FIG. 7A and includes depth predictions 732, 736, confidences 734, 738, and joint depth map 740.

Figure 8:
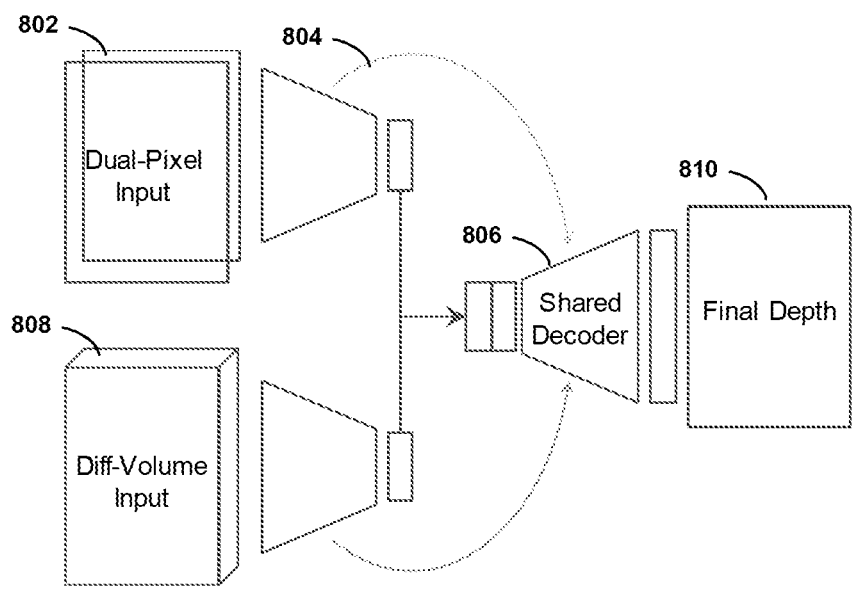
FIG. 8 illustrates a second arrangement of joint depth estimation architecture, according to example embodiments.

In particular, upon receiving dual-pixel input 702 and diff-volume input 710, one or more processes may be performed to determine depth predictions 732, 736 and associated confidences 734, 738. As shown in FIG. 7B, confidence 734 is associated with depth prediction 732 and indicates a higher confidence near boundary of the man represented in the depth maps of implementation 730. Similarly, confidence 738 is associated with depth prediction 736 and indicates a higher confidence on background. As such, a neural network may use and combine depth predictions 732, 736 using confidences 734, 738 to determine joint depth map representation 740. For instance, joint map representation 740 may FIG. 8 illustrates another joint depth estimation architecture, according to example embodiments. Joint depth estimation architecture 800 represents another example architecture that may be used to generate a joint depth map based on multiple inputs, such as dual-pixel input 802 and diff-volume input 808. Other example arrangements are possible.

Dual-pixel input 802 and diff-volume input 808 represent single-camera and multi-camera depth information that may be used an inputs to determine final depth 810, which represents a joint depth map based on the inputs. Particularly, neural network 804 may use one or more encoders and/or a shared decoder 806 to process the inputs to develop a joint depth map for final depth 810. For instance, neural network 804 may include one or more neural networks trained to encode dual-pixel input 802 and diff-volume input 808, combine, and run through shared decoder 806 to produce the joint depth map for final depth 810.

Figure 9:
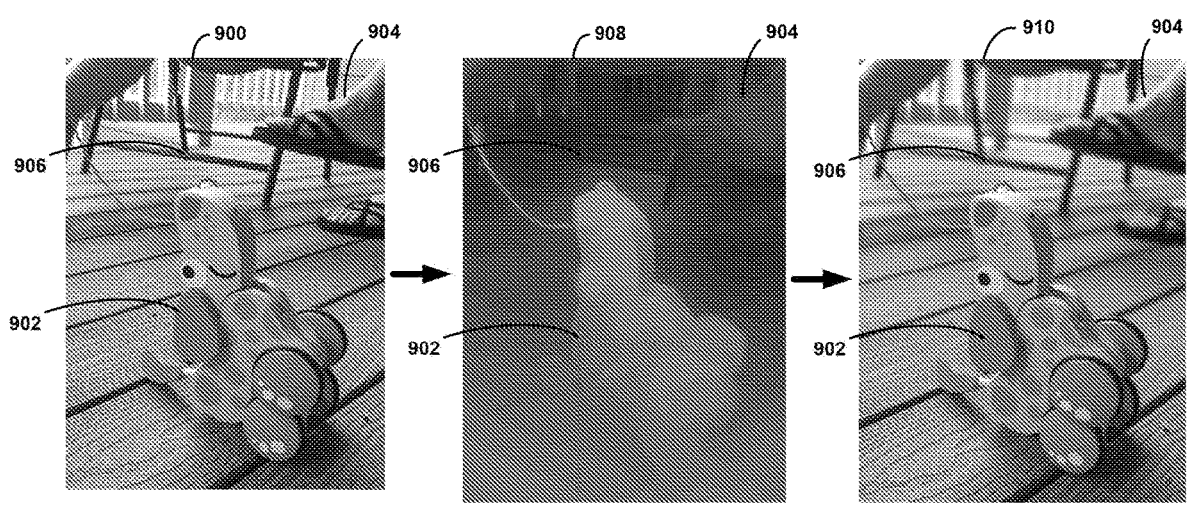
FIG. 9 illustrates a modification of an image based on joint depth estimation, according to example embodiments.

FIG. 9 illustrates a modification of an image based on joint depth estimation, according to example embodiments. Input image 900 represents an image or aggregate of images captured by one or more cameras. For example, a camera of a smart phone or wearable device may capture input image 900. As such, input image 900 conveys a scene that includes toy dog 902 positioned in a foreground of input image 900. Particularly, the scene shows toy dog 902 is positioned on a deck in front of a person's feet 904 and chair 906. As such, input image 900 is shown in FIG. 9 with all elements in the 2D as a clear presentation without any portions of input image 900 blurred. For instance, input image 900 may represents how an image may appear once captured by a camera without any modifications applied.

In some examples, input image 900 may represent a set of images. The set of images may be used to derive joint depth estimation 908 shown in FIG. 9. In one embodiment, joint depth map 908 may be developed by a neural network that used depth estimations derived from input image 900 and other images as described above with respect to FIGS. 6-8.

Joint depth map 908 depicts estimated depths of elements within the scene represented by input image 900. In particular, joint depth map 908 shows estimated depths of portions of input image 900 with lighter portions (e.g., toy dog 902) indicating elements positioned closer to the camera compared to darker portions (e.g., feet 904 and chair 906) positioned in the background. As shown, the shading in joint depth map 908 appears to indicate that toy dog 902 is positioned in a foreground (e.g., lighter shading) while feet 904 and chair 906 appear to have positions in a background (e.g., darker shading). In other words, joint depth map 908 indicates that toy dog 902 was positioned closer to the camera during image capture compared to feet 904 and chair 906.

In addition, FIG. 9 further shows modified image 910, which represents a modified version of the originally captured input image 900. By using joint depth map 908, modified image 910 has been generated with a focus upon toy dog 902 in the foreground and feet 904 and chair 906 in a manner similar to the Bokeh effect.

In some examples, generating modified image 910 may involve sharpening portions of the image to increase image contrast. Particularly, sharpening may enhance the definition of edges in modified image 910. For example, the edges of toy dog 902 may be sharpened. Sharpening may be performed in one step or a series of iterations.

In further examples, generating modified image 910 may involve blurring one or more portions of the image. Blurring may remove image grain and noise from input image 900 and other input images. In some instances, blurring may involve adding or removing noise to portions of modified image 910 to create the blur effect. A Gaussian blur may be used, which involves blurring a portion of an image by a Gaussian function. Unlike the Bokeh effect, a Gaussian blur may produce a smooth blur similar to viewing portions of the image through a translucent screen. As such, Gaussian blurring may be performed to enhance image elements. In other examples, other types of blurring effects can be used. For instance, a circular box blur may be used to blur background elements of modified image 910.

In some examples, generating the new version of the image with the focus upon the portion of the scene and with the one or more other portions of the scene blurred may involve performing edge aware smoothing. In particular, edge aware smoothing may enable a focused upon portion in the new version to have smooth edges relative to the one or more other portions of the scene that are blurred.

In some embodiments, the portions focused upon and the portions blurred within modified image 910 may factor a user input originally received when capturing input image 900. For instance, when preparing to capture input image 900, the camera device may display the viewpoint for the potential image of the camera using a viewfinder. The viewfinder may be a touchscreen that enables a user to select a portion of the scene that the camera should focus upon during image capture. As a result, when generating modified image 910, the camera device may factor the prior selection of the scene by the user when determining which element (e.g., toy dog 902) to focus upon and which elements to blur within modified image 910.

Figure 10:
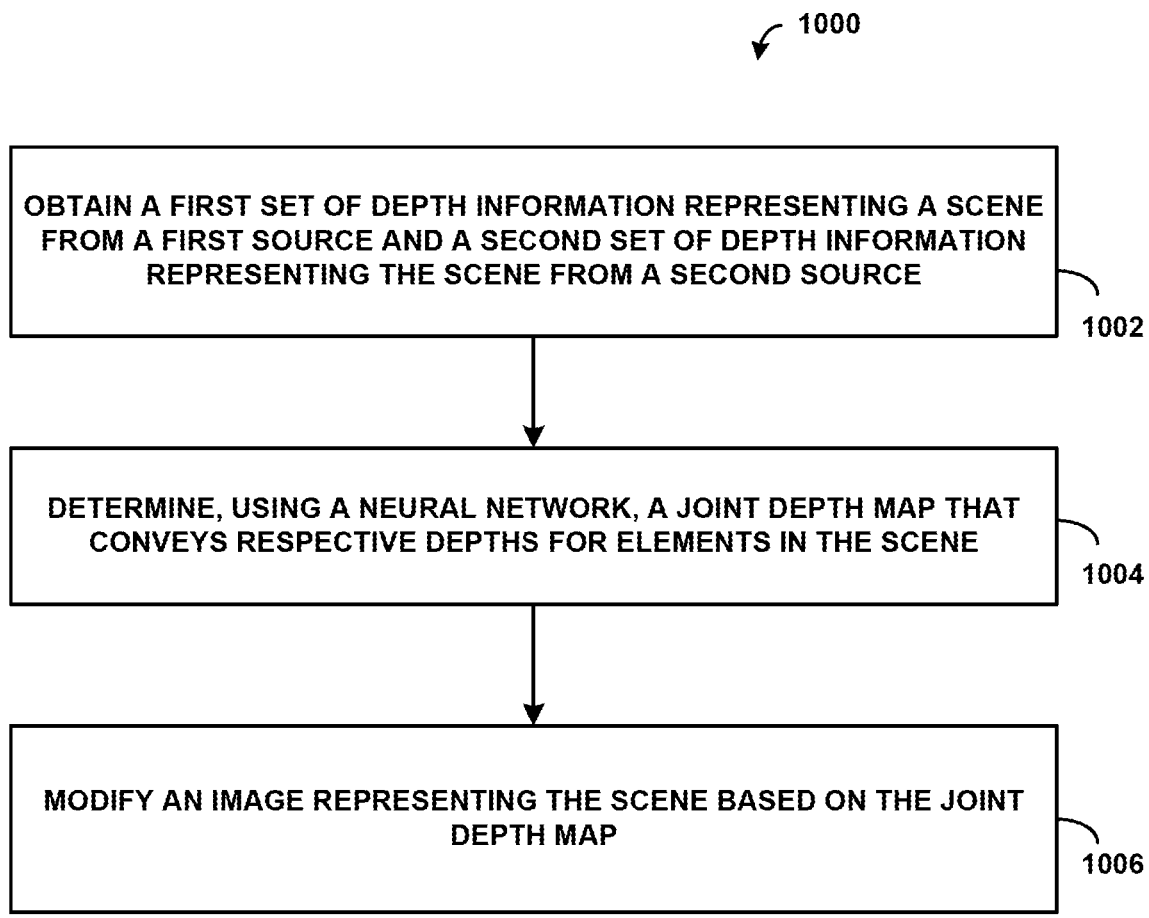
FIG. 10 is a flow chart of a method, according to example embodiments.

FIG. 10 is a flow chart of a method 1000 for implementing a neural light transport function in accordance with example embodiments. Method 1000 may include one or more operations, functions, or actions as illustrated by one or more of blocks 1002, 1004, and 1006. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 1000 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example. Furthermore, for method 1000 and other processes and methods disclosed herein, each block in FIG. 10 may represent circuitry that is wired to perform the specific logical functions in the process.

At block 1002, the method 1000 involves obtaining a first set of depth information representing a scene from a first source and a second set of depth information representing the scene from a second source. A computing system may obtain one or more sets of depth information from various types of sources, including cameras, sensors, and/or computing systems.

The computing system may receive depth information (e.g., the first set of depth information) representing the scene from a single camera where the first set of depth information corresponds to one or more dual pixel images that depict the scene. The first set of depth information may include a first depth estimation of the scene based on dual pixel images obtained from the single camera. In some examples, the computing system may receive depth information (e.g., depth estimates and/or images) from one or more cameras configured to capture images for dual pixel depth estimation and/or green subpixel depth estimation.

In addition, the computing system may receive depth information (e.g., the second set of depth information) from a pair of stereo cameras. Particularly, the second set of depth information may correspond to one or more sets of stereo images that depict the scene. The second set of depth information may include a second depth estimation of the scene generated based on the one or more sets of stereo images that depict the scene. In some examples, the second depth estimation of the scene is determined using a difference volume technique. The difference volume technique may involve projecting a telephoto image on to planes at different depths and subtracting from the main image to form a stack. In some instances, the difference volume technique may enable a depth estimation to be aligned with one or more images.

At block 1004, the method 1000 involves determining, using a neural network, a joint depth map that conveys respective depths for elements in the scene. The neural network may determine the joint depth map based on a combination of the first set of depth information and the second set of depth information. Particularly, the neural network may be trained to determine how to combine multiple sets of depth information derived from multiple sources (e.g., single cameras, stereo cameras) to produce an optimal joint depth map. Optimal joint depth maps may clearly differentiate between different elements in the scene and as well as indicate clear differences between background and foreground elements in the scene. The joint depth map may include sharp edges of elements and other potential improvements over depth maps established using only one technique.

In some examples, determining the joint depth map may involve assigning, by the neural network, a first weight to the first set of depth information and a second weight to the second set of depth information. It may further involve determining the joint depth map based on the first weight assigned to the first set of depth information and the second weight assigned to the second set of depth information. In some instances, assigning, by the neural network, the first weight to the first set of depth information and the second weight to the second set of depth information may be based on a distance between a camera that captured the image of the scene and an element in a foreground of the scene. In addition, the weights assigned to depth information (e.g., images and/or depth estimates) may depend on other factors, such as the training data (e.g., image sets) used to train the neural network.

In some examples, determining the joint depth map may be based on confidences associated with sets of depth information. For instance, the joint depth may be determined based on a first confidence associated with the first set of depth information and a second confidence associated with the second set of depth information. The confidences may be determined in various ways. For instance, computing systems developing depth estimates based on images received from cameras may assign confidences with each estimate. To illustrate, a neural network or another process may be configured to estimate depths based on one or more images using various techniques, such as triangulation, stereo vision, difference volume calculation, dual pixel, and green subpixel, etc. As such, the network or process may also assign a confidence with each depth estimate. The confidence may be for an entirety of the depth estimate or for portions of the depth estimate. In some examples, the computing system may provide the first set of depth information and the second set of depth information as inputs to the neural network such that the neural network uses a first confidence associated with the first set of depth information and a second confidence associated with the second set of depth information to determine the joint depth map.

In addition, determining the joint depth map may be based on using sets of depth information (e.g., the first and second sets) as inputs to the neural network such that the neural network uses a decoder to determine the joint depth map. They may serve as inputs to the neural network when the neural network is trained to perform other imaging processing techniques that can identify depths of and differentiate between elements within the scene.

At block 1006, the method 1000 involves modifying an image representing the scene based on the joint depth map. For example, one or more image modification techniques may be performed on one or more images depicting the scene based on the joint depth map. These images may correspond to images originally captured to develop the sets of depth information or may be new images of the same scene.

In some examples, one or more portions of the image may be partially blurred based on the joint depth map. For instance, background portions of the image may be blurred to make one or more objects in the foreground stand out.

In some examples, training the neural network may involve using a multiple camera rig arranged and synchronized to generate training data. For instance, dual cameras may provide ten views to compute ground truth depth from. In further examples, a joint depth map can be converted into almost metric depth using a sparse point cloud from stereo calibration.

In some examples, a device may perform one or more of the techniques described herein when capturing an image in a particular mode, such as a portrait mode. The particular mode (e.g., portrait mode) may involve a computing system initially estimating the distance of objects at pixels in the scene (i.e., depth determination). The computing system may then render a result by replacing each pixel in the original image (e.g., an HDR+ image) with a translucent disk of size based on depth.

In further examples, a system may use baseline orientation information associated with each depth estimation technique to further enhance texture and line identification and depth estimation. For example, the dual pixels may have a baseline with a first orientation (e.g., vertical) and the dual cameras may have a baseline with a second orientation (e.g., horizontal) that is orthogonal to the first orientation. By having orthogonal orientations, a neural network or another image processing technique may use the orthogonality of the baselines to further enhance deriving information regarding the scene, such as textures, orientations of lines, and depths of elements.

Figure 11:
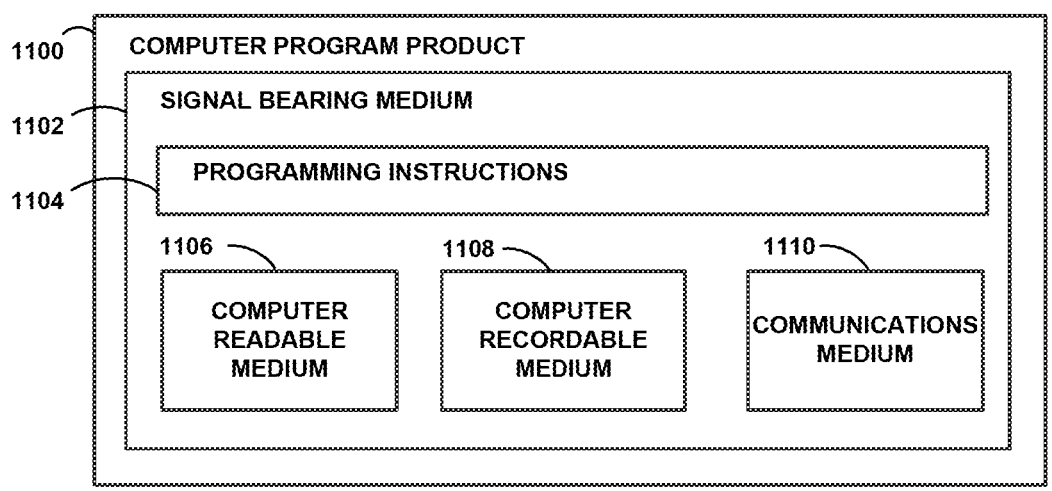
FIG. 11 is a schematic illustrating a conceptual partial view of a computer program for executing a computer process on a computing system, arranged according to at least some embodiments presented herein

FIG. 11 is a schematic illustrating a conceptual partial view of a computer program for executing a computer process on a computing system, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 1100 is provided using signal bearing medium 1102, which may include one or more programming instructions 1104 that, when executed by one or more processors may provide functionality or portions of the functionality described above with respect to FIGS. 1-10. In some examples, the signal bearing medium 1102 may encompass a non-transitory computer-readable medium 1106, such as, but not limited to, a hard disk drive, a Compact Disc (CD), a Digital Video Disk (DVD), a digital tape, memory, etc. In some implementations, the signal bearing medium 1102 may encompass a computer recordable medium 1108, such as, but not limited to, memory, read/write (R/W) CDs, R/W DVDs, etc. In some implementations, the signal bearing medium 1102 may encompass a communications medium 1110, such as, but not limited to, a digital and/or an analog communication medium (e.g., a fiber optic cable, a waveguide, a wired communications link, a wireless communication link, etc.). Thus, for example, the signal bearing medium 1102 may be conveyed by a wireless form of the communications medium 1110.

The one or more programming instructions 1104 may be, for example, computer executable and/or logic implemented instructions. In some examples, a computing device such as the computer system 100 of FIG. 1 may be configured to provide various operations, functions, or actions in response to the programming instructions 1104 conveyed to the computer system 100 by one or more of the computer readable medium 1106, the computer recordable medium 1108, and/or the communications medium 1110.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   obtaining, at a computing system, a first set of depth information representing a scene from a first source having a first parallax, wherein the first source comprises a single camera, and wherein the first set of depth information corresponds to one or more dual pixel images that depict the scene;
   obtaining, at the computing system, a second set of depth information representing the scene from a second source having a second parallax, wherein the first set of depth information is associated with the first parallax, the second set of depth information is associated with the second parallax, and the first parallax is different than the second parallax;
   determining, at the computing system and using a neural network, a joint depth map that conveys respective depths for elements in the scene, wherein the neural network determines the joint depth map based on a combination of the first set of depth information and the second set of depth information; and
   modifying an image representing the scene based on the joint depth map.

2. The method of claim 1, wherein obtaining the first set of depth information representing the scene from the first source comprises:
   receiving a first depth estimation of the scene based on the one or more dual pixel images.

3. The method of claim 1, wherein obtaining the second set of depth information representing the scene from the second source comprises:
   receiving the second set of depth information representing the scene from a pair of stereo cameras, wherein the second set of depth information corresponds to one or more sets of stereo images that depict the scene.

4. The method of claim 3, wherein obtaining the second set of depth information representing the scene from the second source comprises:
   receiving a second depth estimation of the scene based on the one or more sets of stereo images that depict the scene.

5. The method of claim 1, wherein determining the joint depth map that conveys respective depths for elements in the scene comprises:
   assigning, by the neural network, a first weight to the first set of depth information and a second weight to the second set of depth information; and
   determining the joint depth map based on the first weight assigned to the first set of depth information and the second weight assigned to the second set of depth information.

6. The method of claim 5, wherein assigning, by the neural network, the first weight to the first set of depth information and the second weight to the second set of depth information is based on a distance between a camera that captured the image of the scene and an element in a foreground of the scene.

7. The method of claim 1, wherein determining the joint depth map that conveys respective depths for elements in the scene comprises:
   determining the joint depth map based on a first confidence associated with the first set of depth information and a second confidence associated with the second set of depth information.

8. The method of claim 1, wherein determining the joint depth map that conveys respective depths for elements in the scene comprises:
   providing the first set of depth information and the second set of depth information as inputs to the neural network such that the neural network uses a decoder to determine the joint depth map.

9. The method of claim 1, wherein determining the joint depth map that conveys respective depths for elements in the scene comprises:
   providing the first set of depth information and the second set of depth information as inputs to the neural network such that the neural network uses a first confidence associated with the first set of depth information and a second confidence associated with the second set of depth information to determine the joint depth map.

10. The method of claim 1, wherein modifying the image representing the scene based on the joint depth map comprises:
    applying a partial blur to one or more background portions of the image based on the joint depth map.

11. The method of claim 1, wherein the first source and the second source are in a smartphone.

12. A system comprising:
    a plurality of sources, wherein the plurality of sources includes a first source and a second source, and wherein the first source comprises a single camera;
    a computing system comprising a processor configured to:
      obtain a first set of depth information representing a scene from the first source having a first parallax, wherein the first set of depth information corresponds to one or more dual pixel images that depict the scene;
      obtain a second set of depth information representing the scene from the second source having a second parallax, wherein the first set of depth information is associated with the first parallax, the second set of depth information is associated with the second parallax, and the first parallax is different than the second parallax;

determine, using a neural network, a joint depth map that conveys respective depths for elements in the scene, wherein the neural network determines the joint depth map based on a combination of the first set of depth information and the second set of depth information; and modify an image representing the scene based on the joint depth map.

13. The system of claim 12, wherein the first set of depth information includes a first depth estimation of the scene based on the one or more dual pixel images.

14. The system of claim 12, wherein the computing system is configured to receive the second set of depth information representing the scene from a pair of stereo cameras in the smartphone such that the second set of depth information corresponds to one or more sets of stereo images that depict the scene.

15. The system of claim 14, wherein the second set of depth information includes a second depth estimation of the scene based on the one or more sets of stereo images, wherein the second depth estimation of the scene is determined using a difference volume technique.

16. The system of claim 12, wherein the computing system is configured to determine, using the neural network, the joint depth map that conveys respective depths for elements in the scene based on a first confidence associated with the first set of depth information and a second confidence associated with the second set of depth information.

17. The system of claim 12, wherein the computing system is configured to determine, using the neural network, the joint depth map that conveys respective depths for elements in the scene based on an application of a decoder on the first set of depth information and the second set of depth information by the neural network.

18. The system of claim 12, wherein the computing system is configured to modify the image representing the scene by applying a partial blur to one or more background portions of the image based on the joint depth map.

19. The system of claim 12, wherein the first source and the second source are in a smartphone.

20. A non-transitory computer-readable medium configured to store instructions, that when executed by a computing system comprising one or more processors, causes the computing system to perform operations comprising:

obtaining a first set of depth information representing a scene from a first source having a first parallax, wherein the first source comprises a single camera, and wherein the first set of depth information corresponds to one or more dual pixel images that depict the scene;

obtaining a second set of depth information representing the scene from a second source having a second parallax, wherein the first set of depth information is associated with the first parallax, the second set of depth information is associated with the second parallax, and the first parallax is different than the second parallax;

determining, using a neural network, a joint depth map that conveys respective depths for elements in the scene, wherein the neural network determines the joint depth map based on a combination of the first set of depth information and the second set of depth information; and modifying an image representing the scene based on the joint depth map.

* * * * *